United States Patent
Aasen et al.

(10) Patent No.: US 11,733,345 B2
(45) Date of Patent: Aug. 22, 2023

(54) LOCATION-BASED FUNCTIONALITY USING ACOUSTIC LOCATION DETERMINATION TECHNIQUES

(71) Applicant: Sonitor Technologies AS, Oslo (NO)

(72) Inventors: Terje Aasen, Indian Rocks Beach, FL (US); Wilfred Edwin Booij, Oslo (NO)

(73) Assignee: Sonitor Technologies AS, Oslo (NO)

( * ) Notice: Subject to any disclaimer, the term of this patent is extended or adjusted under 35 U.S.C. 154(b) by 0 days.

(21) Appl. No.: 16/964,849

(22) PCT Filed: Jan. 23, 2019

(86) PCT No.: PCT/IB2019/050577
§ 371 (c)(1),
(2) Date: Jul. 24, 2020

(87) PCT Pub. No.: WO2019/145879
PCT Pub. Date: Aug. 1, 2019

(65) Prior Publication Data
US 2021/0063526 A1    Mar. 4, 2021

Related U.S. Application Data

(60) Provisional application No. 62/622,448, filed on Jan. 26, 2018.

(51) Int. Cl.
*G01S 5/30* (2006.01)
*H04W 4/029* (2018.01)
(Continued)

(52) U.S. Cl.
CPC ............... *G01S 5/30* (2013.01); *H04B 11/00* (2013.01); *H04M 1/72457* (2021.01); *H04W 4/029* (2018.02)

(58) Field of Classification Search
CPC . G01S 5/30; H04M 1/72457; H04M 1/72577; H04B 11/00; H04W 4/029;
(Continued)

(56) References Cited

U.S. PATENT DOCUMENTS

2013/0127980 A1* 5/2013 Haddick ............ G02B 27/0093
348/14.08
2014/0309806 A1* 10/2014 Ricci ..................... G06F 21/32
701/1
(Continued)

OTHER PUBLICATIONS

International Search Report dated May 24, 2019 for Appl. No. PCT/IB2019/050577, 4 pages.
(Continued)

*Primary Examiner* — Daniel L Murphy
*Assistant Examiner* — Amie M Ndure
(74) *Attorney, Agent, or Firm* — Sterne, Kessler, Goldstein & Fox P.L.L.C.

(57) ABSTRACT

Systems and methods of providing location-based functionality using acoustic location determination techniques are disclosed. For instance, acoustic signals can be received from one or more transmitting devices associated with a real-time locating system. A location of a mobile computing device can be determined based at least in part on the received acoustic signals. One or more actions to perform can be determined based at least in part on a control scheme associated with the real-time locating system and the determined location. The one or more actions can be performed.

20 Claims, 4 Drawing Sheets

(51) Int. Cl.
*H04M 1/72457* (2021.01)
*H04B 11/00* (2006.01)

(58) Field of Classification Search
CPC ....... H04W 4/02; H04W 8/005; H04W 4/008; H04W 4/046; H04W 88/02
See application file for complete search history.

(56) References Cited

U.S. PATENT DOCUMENTS

| | | | |
|---|---|---|---|
| 2016/0127875 A1* | 5/2016 | Zampini, II | G01S 5/00 370/311 |
| 2017/0019525 A1* | 1/2017 | Hannon | G01S 5/0036 |
| 2017/0154638 A1 | 6/2017 | Hwang et al. | |
| 2017/0328997 A1* | 11/2017 | Silverstein | G01S 13/56 |
| 2017/0366938 A1* | 12/2017 | Wootton | H04B 17/318 |
| 2018/0350214 A1* | 12/2018 | Roth | G08B 13/19613 |
| 2019/0051342 A1* | 2/2019 | Wootton | G11C 11/2293 |

OTHER PUBLICATIONS

Written Opinion dated May 24, 2019 for Appl. No. PCT/IB2019/05077, 5 pages.

* cited by examiner

LOCATION-BASED FUNCTIONALITY USING ACOUSTIC LOCATION DETERMINATION TECHNIQUES

FIELD

The present disclosure relates generally to location-based services for a mobile computing device, and more particularly to location-based services using acoustic location determination techniques.

BACKGROUND

Location-based functionality can be implemented by a mobile computing device to perform various operations in response to a detection of a presence of the mobile computing device at various locations. Such location-based functionality can tailor the operation of the mobile computing device to various contexts or circumstances related to different locations. For instance, a smartphone can automatically implement a "silent mode" upon a detection of the mobile device at a movie theater or other location where sounds output by the smartphone would be distracting. Implementation of such location-based functionality may require very efficient, accurate, and reliable location determination techniques to ensure that the mobile computing device operates in a suitable manner based on an accurate location determination.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of providing location-based functionality by a mobile computing device using acoustic signals. The method includes receiving, by a mobile computing device, acoustic signals from one or more transmitting devices associated with a real-time locating system. The method further includes determining, by the mobile computing device, a location of the mobile computing device based at least in part on the received acoustic signals. The method further includes determining, by the mobile computing device, one or more actions to perform based at least in part on a control scheme associated with the real-time locating system and the determined location. The method further includes performing, by the mobile computing device, the one or more actions.

Other aspects of the present disclosure are directed to systems, apparatus, tangible, non-transitory computer-readable media, user interfaces and devices for providing location-based functionality using acoustic location determination techniques.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
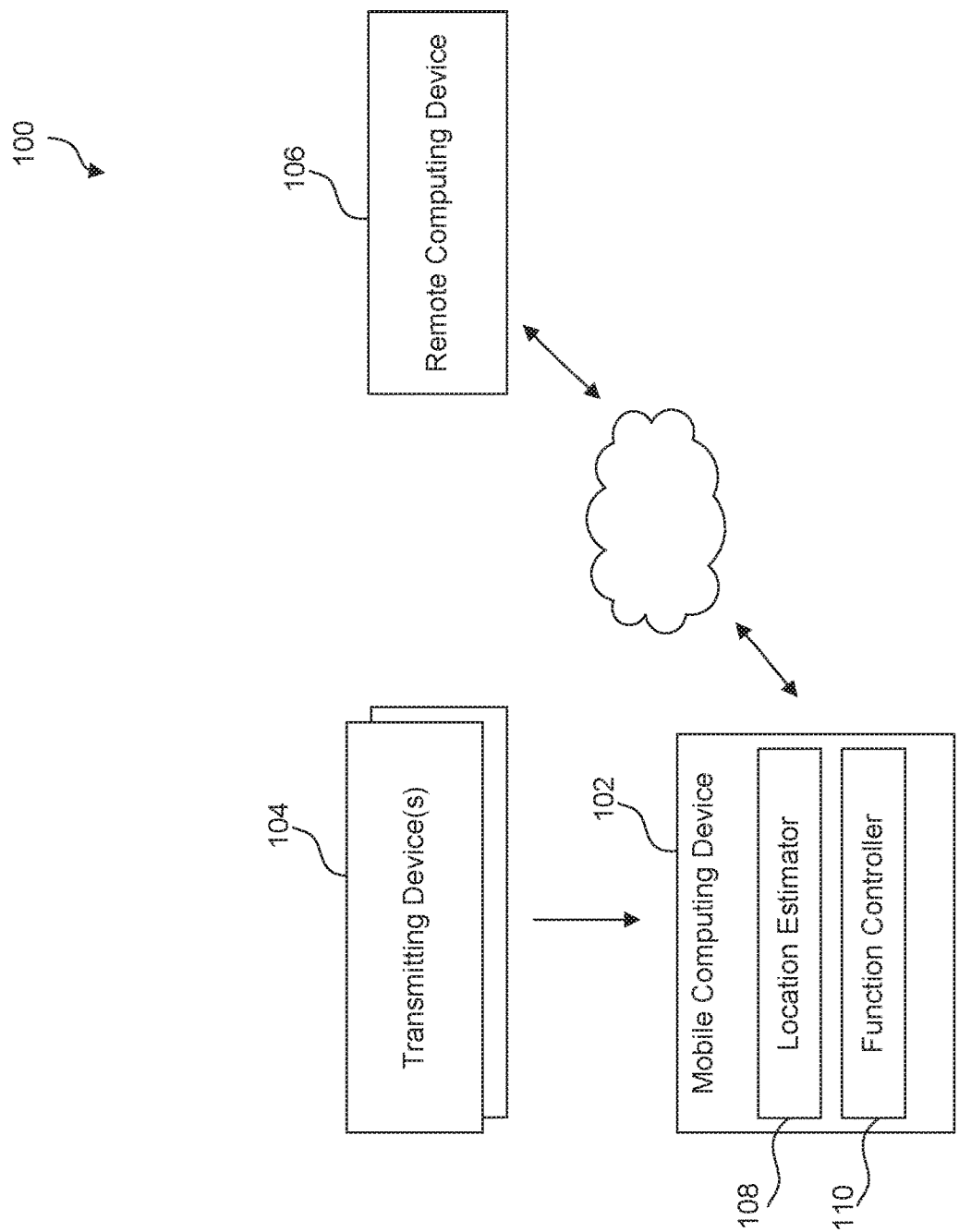
FIG. 1 depicts an example real-time locating system according to example aspects of the present disclosure.

Reference will now be made in detail to embodiments, one or more examples of which are illustrated in the drawings. Each example is provided by way of explanation of the embodiments, not limitation of the invention. In fact, it will be apparent to those skilled in the art that various modification and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Example aspects of the present disclosure are directed to providing location-based services for mobile computing devices based at least in part on acoustic (e.g. ultrasonic) signals provided by one or more transmitting devices associated with a real-time locating system. There are many scenarios where it would be advantageous to automatically restrict, limit, or otherwise alter the functionality of a mobile computing device based at least in part on the location or other circumstance associated with the mobile computing device. For instance, it could be advantageous to automatically limit the ability of a driver of a car or other vehicle to operate a mobile computing device while driving. As another example, it could be advantageous to automatically disable one or more radio transmitters and/or receivers of mobile computing devices located on an airplane during certain phases of a flight. As yet another example, it could be advantageous to automatically restrict a student's access to certain applications (e.g. social media applications) installed on the student's smartphone while the student is in class.

Such functionality requires very reliable and accurate location determination techniques to reliably and accurately detect the presence of a mobile computing device within a restricted area (e.g. in the driver's seat of a vehicle, onboard an airplane, in a particular classroom, etc.). More particularly, to be sufficient for various typical use cases, the false positive error rate for location determination (e.g. room determination, etc.) should be less than 1 in 100000. Such rate is typically only achievable using acoustic (e.g. ultrasound) location determination techniques. Acoustic real-time locating systems may operate with different levels of accuracy depending on available system infrastructure. In some embodiments, room-level accuracy of location information is sufficient whereas other use cases require one-dimensional, two-dimensional, or even three-dimensional resolution of position within a room. In some embodiments, a system provides three-dimensional location information about persons or equipment in real-time. A real-time locating system can include a network of acoustic transmitting devices attached to interior surfaces in an environment and mobile computing devices attached to or carried by moveable objects or people. The mobile devices receive signals from the acoustic transmitting devices to determine descriptive location information or three-dimensional locational coordinates within the environment. Acoustics, e.g., ultrasound, is well-suited for this purpose because it travels slower than radio waves and generally goes unnoticed by humans. Acoustic waves also attenuate more rapidly and do not penetrate walls, which avoids signal interference between rooms. Further, location determination techniques using RF and/or infrared technologies can be inaccurate, inefficient, or can require processing delays. Such inaccuracies, inefficiencies, and/or processing delays can lead to false positive location determinations and/or can lead to inappropriate or unresponsive functionality control of the mobile computing device. For instance, typical processing delays sufficient for various typical use cases are generally on the order of 1.5 seconds or less. Acoustic location determination techniques according to example aspects of the present disclosure can generally achieve such low processing delays.

In this manner, according to example aspects of the present disclosure location-based services can be provided based at least in part on acoustic (e.g. ultrasonic) location determination techniques. For instance, acoustic signals can be received by a mobile computing device. The acoustic signals can be transmitted by one or more transmitting devices associated with an acoustic real-time locating system. The real-time locating system can include one or more transmitting devices positioned within an environment (e.g. car, airplane, school, factory, hospital, campus, factory, business, restaurant, store, shopping mall, movie theater, concert hall, etc.). The transmitting devices can periodically transmit acoustic signals that can be received by one or more suitable mobile computing devices located within a broadcast range of the transmitting devices. A location of the mobile computing device can be determined based at least in part on the received acoustic signals. One or more actions to be performed by the mobile computing device can subsequently be determined based at least in part on the determined location of the mobile computing device and a control scheme associated with the real-time locating system. The control scheme can specify various conditions (e.g. locations, time periods, contexts, and/or events) associated with the environment, and can further correlate the conditions with actions to be performed by the mobile computing device and/or operating modes associated with the mobile computing device. In this manner, the control scheme can be accessed in response to reception of the acoustic signals and/or determination of the location of the mobile computing device to determine if one or more actions need to be performed by the mobile computing device in response to the determined location of the mobile computing device. In some implementations, the determined actions can be performed to bring the mobile computing device into a desired operating mode in accordance with the control scheme.

The mobile computing device can be any suitable mobile computing device, such as a mobile telephone, smartphone, tablet, laptop, wearable computing device, and/or other suitable mobile computing device capable of being transported by a user while in operation. The actions to be performed by the mobile computing device may be dependent on the mobile computing device (e.g. the functionality and/or capabilities of the mobile computing device). For instance, such actions may include disabling use of one or more aspects of the mobile computing device, disabling one or more radio transmitters and/or receivers of the mobile computing device, disabling and/or blocking access to one or more applications installed on the mobile computing device, limiting access to one or more applications installed on the mobile computing device, adjusting an audio mode of the mobile computing device (e.g. silencing ringtones, keyboard clicks, notification sounds and/or other sounds associated with the mobile computing device), adjusting a security mode of the mobile computing device, sending a message (e.g. text message) to one or more predetermined recipients, controlling one or more other devices (e.g. smart home devices, lighting devices, speaker devices, etc.) and/or other suitable actions. In implementations wherein one or more other devices are controlled, a user of the mobile computing device may be prompted with a security code or password prior to control of the other device(s). In this manner, the actions to be taken may correspond to the capabilities of the particular mobile computing device. In implementations wherein the control scheme specifies particular operating modes to implement by the mobile computing device, such operating modes may include a silent mode wherein ringtones, keyboard clicks, notification sounds, etc. are disabled on the mobile computing device 102, an airplane mode wherein one or more radios (e.g. RF radios) are disabled on the mobile computing device, a "do not disturb" mode wherein various notifications and/or alerts are not provided to a user of the mobile computing device, a security mode wherein a passcode is required upon waking a display of the mobile computing device, an education mode wherein access is blocked to various applications (e.g. social media applications) installed on the mobile computing device, a driving mode wherein access is limited with respect to various aspects (e.g. the ability to make telephone calls, send text messages, access applications, etc.) of the mobile computing device, etc. The operating modes and/or actions may be customized for particular mobile computing devices, locations, contexts, times, etc. In this manner, a user can implement a suitable control scheme through interaction with one or more computing devices associated with the real-time locating system.

In some implementations, the location determined by the mobile computing device may be a relative location determined with respect to the environment. Such relative location may be a location within the environment, such as a location in a particular room, zone, area, seat, building, etc. In this manner, the control scheme may correlate such relative locations to actions to be performed when a mobile computing device is located within the relative location. The location may be determined to various suitable resolutions, for instance, depending on a required resolution specified by the control scheme. For instance, the location can be determined at a building level, a room level, at a sub-room level, etc.

The location may be determined in various suitable manners. For instance, the mobile computing device may determine the relative location based at least in part on one or more identifying signals associated with the received acoustic signals and known locations of the transmitting devices associated with the real-time locating system. In this manner, the transmitting devices can broadcast identifying signals specifying respective identities of the transmitting devices, which can be detected or decoded by a mobile computing device, and used to determine the location of the mobile computing device. For instance, if a particular transmitting device has been installed in a closed room within an environment, and a mobile computing device receives an acoustic signal from the particular transmitting device, then it may be determined that the mobile computing device is located within the closed room. Therefore, if each of the transmitting devices of the real-time locating system emits an identifying signal and the location of each transmitting device is known, then the location of a mobile computing device may be determined upon its receipt of an acoustic signal from a particular acoustic transmitting device and its associated identity.

Similarly, if a mobile computing device receives acoustic signals from each of two separately identifiable transmitting devices, then it may be determined that the mobile computing device is located in the vicinity of both of the two separately identifiable transmitting devices. For example, were the two separately identifiable transmitting devices placed at the two opposite ends of a corridor, then a mobile computing device situated in the corridor would likely receive signals from the two separately identifiable transmitting devices, and the location of the mobile computing device could be established. In other embodiments, more precise and/or accurate locations of a mobile computing device may be established. For example, arrival times of acoustic signals at a mobile computing device may be used to find the location of the mobile computing device in the environment, using various suitable geometric calculations. More particularly, the location may be determined using triangulation, trilateration, multilateration, and/or other suitable techniques. In this manner, various signal measurements associated with the received acoustic signals may be used to facilitate determination of the location of the mobile computing device. Such signal measurements may include a time of arrival, time of flight, angle of arrival, signal strength, and/or time difference of arrival of the received acoustic signals. It will be appreciated that other additional and/or alternative suitable measurements may be used to facilitate determination of the location of the mobile computing device. For instance, such measurements may include a motion induced frequency shift (e.g. Doppler shift), signal-to-noise ratio, signal phase, and/or other suitable measurements. In addition the mobile computing device may use the acoustic receive characteristics of its one or more acoustic receiver signal chains in the location determination. Such information may include microphone sensitivity, directivity, frequency dependence, and/or other suitable information. This information may be stored on the mobile computing device or retrieved from the server from a database based at least in part on the model type number of the mobile computing device and/or other suitable identifying information associated with the mobile computing device.

In an embodiment, the mobile computing device location can be determined based at least in part on data associated with the received acoustic signals and/or the environment near the transmitting device such as one or more rooms, spaces, structures, buildings, regions, etc. in which the transmitting device resides. More particularly, such data descriptive of the received acoustic signals may include, for instance, a sound pressure level, signal coding type, signal identification, signal direction normal, signal spatial distribution, signal period, and/or other suitable data. Such environmental data may include specific details associated with the environment. For instance, the environmental data may indicate the respective room, building, campus, area, etc. where a transmitting device is located. The environmental data may further include data specifying an organization, configuration, or hierarchy of the environment in which the transmitting device is located. For instance, such environmental data may include data specifying a relationship between a particular room and a particular building (e.g., a location of the room within the building).

The environmental data may further include dimensional data associated with the environment. For instance, dimensional data may include the dimensions of one or more reflective surfaces (e.g. walls, ceilings, floors, objects, furniture, etc.) within a room in which a transmitting device is located. The dimensional data may further include data indicative of the normal direction of the reflective surfaces. The environmental data may further include data indicative of the acoustic attenuation of such reflective surfaces. The environmental data may further include data indicative of the relative locations of the acoustic transmitting devices within a particular room, building, area, etc. More particularly, such environmental data may include an identifier of a surface (e.g. wall, floor, ceiling, etc. of a room) on which a transmitting device is located and/or data indicative of a location and/or orientation of the transmitting device with respect to the surface. The environmental data may further include atmospheric data indicative of the speed of sound, temperature, pressure, humidity, etc. within the environment. In certain embodiments, since the environmental data changes over time, the environmental data updates frequently to reflect current environmental conditions.

In this manner, upon receipt of acoustic signals from an identifiable transmitting device, the mobile computing device may access such suitable environmental data associated with the transmitting device and/or the environment in which the transmitting device is located. The environmental data may be used in conjunction with arrival times, angles of arrival, time difference of arrival, times of flight, etc. of the acoustic signals to determine the location of the mobile computing device within the environment using suitable geometric calculations.

Upon a reception of reception of acoustic signals and/or a determination of the location of the mobile computing device, the mobile computing device may access the suitable control scheme associated with the environment and/or the identified transmitting device(s). The mobile computing device may determine one or more tasks, actions, operations, etc. to perform to bring the mobile computing device into the operating mode as specified by the control scheme. For instance, in some implementations, such tasks, actions, and/or operations may be determined to implement an operating mode in which to operate while the mobile computing device is located within the environment. As indicated, the actions and/or operating modes specified in the control scheme can be correlated to one or more locations, events, time periods, etc. For instance, the control scheme can specify that access to one or more social media applications installed on a smartphone of a student should be blocked while the smartphone is located in a particular classroom at a school. As another example, the control scheme can specify that access to the social media application(s) should be blocked while the smartphone is located in the classroom, but only during school hours.

In some implementations, the control scheme may be located at the mobile computing device. In some implementations, the control scheme can be located remotely, for instance, at a server associated with the real-time locating system, and communicated to the mobile computing device upon receipt of suitable acoustic signals and/or a determination of a suitable location of the mobile computing device (e.g. a location within the environment of the real-time locating system). The control scheme may be tailored to individual users and/or corresponding mobile computing devices, and/or groups of users and corresponding mobile computing devices. For instance, as indicated, a control scheme for a smartphone of a student in a classroom may specify that access is to be blocked to social media application(s) installed on the smartphone, but a control scheme for a smartphone of the teacher of the class may not specify that access is to be blocked to the application(s). The control scheme for a particular mobile computing device may be specified, modified, adapted, etc. by a user of the mobile computing device and/or an operator of the real-time locating system. For instance, in some implementations, a user of a mobile computing device can input control scheme parameters for the mobile computing device through an interaction with the mobile computing device. In some implementations, the control scheme parameters may be input at a server or other central computing device associated with the real-time locating system.

As indicated, according to example aspects of the present disclosure, various actions or operations can be performed responsive to various suitable conditions being met, as specified by a control scheme. In particular, such actions or operations can be performed by a mobile computing device associated with the user. The actions or operations may be performed at an application level, an operating system level (e.g. not within an application installed on the mobile computing device), and/or at any other suitable level. In this manner, various suitable actions or operations may be performed in accordance with the control scheme at various suitable levels on the mobile computing device.

With reference now to the figures, example aspects of the present disclosure will be discussed in greater detail. For instance, FIG. 1 depicts an example real-time locating system 100 according to example aspects of the present disclosure. The real-time locating system 100 includes a mobile computing device 102, one or more transmitting devices 104 and a remote computing device 106. The mobile computing device 102 includes a location estimator 108 and a function controller 110. The locating system 100 can be implemented within any suitable environment, such as within a building, campus, room, corridor, factory, vehicle (car, airplane, etc.), school, hospital, restaurant, concert hall, theater, business, and/or other suitable environment. In this manner, the one or more transmitting devices 104 can be positioned within the environment in a desired manner such that a suitable location of the mobile computing device 102 (and/or other suitable mobile computing devices) can be determined upon receipt of acoustic signals by the mobile computing device 102. More particularly, the one or more transmitting devices 104 may be positioned in known locations throughout the environment, such as mounted to or otherwise attached to various suitable surfaces (e.g. walls, ceilings, floors, etc.) within the environment. The one or more transmitting devices 104 can be configured to transmit acoustic (e.g. ultrasonic) signals that can be received by the mobile computing device 102. For instance, the one or more transmitting devices 104 may be configured to transmit ultrasonic signals having frequencies of between about 20 kHz and about 40 kHz. As used herein, the term "about," when used in conjunction with a numeral is intended to refer to within 30% of the numeral. The one or more transmitting devices 104 can be any suitable transmitting device configured to transmit suitable acoustic (e.g. ultrasonic) signals. For instance, such transmitting device(s) 104 can be stand-alone and/or self-contained devices, or the transmitting device(s) can be implemented within or otherwise associated with one or more other devices, such as a thermostat, home control device (e.g. smart assistant device), television, speaker, radio, etc.)

In some implementations, the acoustic signals can encode identifying data associated with the transmitting device(s) 104 and/or other data, such as data descriptive of characteristics of the acoustic signals including, for example, a sound pressure level, signal coding type, signal identification, signal direction normal, signal spatial distribution, signal period, and/or other suitable data. Such encoded data may further include environmental data descriptive of the environment in which the transmitting device is located. In some implementations, the data descriptive of the acoustic signal characteristics and/or the environmental data may be provided by the remote computing device 106 or other suitable computing device (as opposed to being encoded in the acoustic signals).

In some implementations, the acoustic signals can encode control scheme data, such as data indicative of one or more actions to be performed by a mobile computing device (e.g. the mobile computing device 102) in response to receiving the acoustic signals. In such implementations, the control scheme data can be determined based at least in part on a context and/or time period associated with the environment. For instance, were the transmitting device 104 positioned within an airplane, the transmitting device could be could be configured to transmit different acoustic signals (e.g. encoding different control scheme data) during different phases of a flight. More particularly, during an initial takeoff phase of the flight, the transmitting device 104 could provide first acoustic signals encoding data instructing the mobile device 102 to implement an airplane mode (e.g. by disabling one or more RF radios associated with the mobile computing device 102). In response to receiving such signals, the function controller 110 could implement the airplane mode on the mobile computing device 102. After the airplane lands, the transmitting device 104 could provide second acoustic signals encoding data instructing the mobile computing device 102 that it is acceptable to operate the mobile computing device 102 in a normal operating mode (e.g. it is safe to reactivate the RF radio(s)). Upon receipt of such signals, the function controller 110 could release the airplane mode and implement a normal or default operating mode of the mobile computing device 102.

As indicated, the mobile computing device includes a location estimator 108 and a function controller 110. The location estimator 108 can be configured to determine a location of the mobile computing device based at least in part on acoustic signals received from the one or more transmitting devices 104. In particular, the mobile computing device 102 may detect and/or decode the received acoustic signals to identify an identity of the transmitting device(s) 104 from which the received acoustic signals were transmitted and/or any other suitable data encoded in the acoustic signals. The location estimator 108 can estimate a location of the mobile computing device 102 based at least in part on such decoded data and/or other suitable data. In various implementations, the location may be estimated to various suitable resolutions. For instance, the location may be determined at a building level, a room level, a sub-room level, a zone or area level, etc. In some implementations, the estimated location may be a one-dimensional, two-dimensional, or three-dimensional location within the environment. In some implementations, the resolution of the location may be dependent on a control scheme associated with the real-time locating system 100. As will be described in greater detail below, the control scheme can correlate various suitable locations with actions to be performed by the mobile computing device 102. In this manner, the control scheme can specify a location of a particular resolution and can further specify one or more actions to be performed by the mobile computing device 102 when the mobile computing device 102 is located at the location. For instance, the control scheme can specify a classroom in a school and one or more actions to be performed by the mobile computing device 102 in response to a determination by the mobile computing device 102 that the mobile computing device 102 is located within the classroom. In such instance, upon a determination that the mobile computing device 102 is located within the classroom (e.g. based at least in part on the decoded identifier associated with the transmitting device 104 located in the classroom), the mobile computing device 102 can proceed to performing the one or more actions without determining a more accurate location within the classroom. In other instances, when the control scheme specifies locations with a higher resolution, such as a sub-room level location and/or a location with a particular zone or area, the mobile computing device 102 may need to determine a location with a suitably higher resolution and/or accuracy.

The location estimator 108 can determine the location of the mobile computing device in various suitable manners. For instance, in some implementations the location may be determined based at least in part on the identifying data encoded in the acoustic signals. In some implementations, a more accurate or precise location may be determined using various suitable geometric calculations, the data descriptive of various characteristics of the acoustic signals, the environmental data, and/or other suitable data. For example, the location estimator 108 can use arrival times (and/or related data) of the acoustic signals at the mobile computing device 102 to find the location of the mobile computing device in the environment, using various suitable geometric calculations. More particularly, the location estimator 108 can determine the location using triangulation, trilateration, multilateration, and/or other suitable techniques. In this manner, the location estimator 108 may use various signal measurements associated with the received acoustic signals to facilitate determination of the location of the mobile computing device 102. Such signal measurements may include a time of arrival, time of flight, angle of arrival, signal strength, and/or time difference of arrival of the received acoustic signals. It will be appreciated that other additional and/or alternative suitable measurements may be used to facilitate determination of the location mobile computing device 102. For instance, such measurements may include a motion induced frequency shift (e.g. Doppler shift), signal-to-noise ratio, signal phase, and/or other suitable measurements. In addition, the location estimator 108 may use the acoustic receive characteristics of one or more acoustic receiver signal chains of the mobile computing device 102 in the location determination. Such information may include microphone sensitivity, directivity, frequency dependence, and/or other suitable information. This information may be stored at the mobile computing device 102 or retrieved from the remote computing device 106 based at least in part on the model type number of the mobile computing device 102 and/or other suitable identifying information associated with the mobile computing device.

Upon a determination of a suitable location of the mobile computing device 102, the function controller 110 can access the control scheme to determine one or more actions to be performed as specified by the control scheme. As indicated, the control scheme can correlate locations with one or more actions to be performed by the mobile computing device 102. The actions to be performed can be implemented in hardware, software, firmware, etc. Such actions can control or modify various aspects of the functionality, capabilities, and/or settings of the mobile computing device 102. As various examples, such actions can include silencing ringtones, keyboard clicks, notification sounds and/or other sounds associated with the mobile computing device 102, disabling one or more radios (e.g. RF radios) associated with the mobile computing device 102, blocking access to one or more applications, websites, etc. installed on or otherwise associated with the mobile computing device 102, disabling a provision of notifications by the mobile computing device 102, and/or other suitable actions.

In some implementations, the control scheme can correlate one or more locations with one or more operating modes in which the mobile computing device 102 is to operate. Operating modes may define functionality (e.g. capabilities, statuses, and/or settings) of the mobile computing device 102. In this manner, implementation of an operating mode may implement such functionality within hardware, software, firmware, etc. of the mobile computing device 102. Example operating modes include silent mode wherein ringtones, keyboard clicks, notification sounds, etc. are disabled on the mobile computing device 102, airplane mode wherein one or more radios (e.g. RF radios) are disabled on the mobile computing device 102, "do not disturb" mode wherein various notifications and/or alerts are not provided to a user of the mobile computing device 102, security mode wherein a passcode is required upon waking a display of the mobile computing device 102, etc. In some implementations, the operating modes may be tailored to particular contexts or circumstances associated with the real-time locating system 100 and/or the environment in which the real-time locating system 100 is located. For instance, such operating modes can include an education mode wherein access is blocked to various applications (e.g. social media applications) installed on the mobile computing device 102, a driving mode wherein access is limited with respect to various aspects (e.g. the ability to make telephone calls, send text messages, access applications, etc.) of the mobile computing device 102, etc. It will be appreciated that any suitable operating modes defining various suitable functionalities may be used without deviating from the scope of the present disclosure. In some implementations, a user of the mobile computing device 102 can implement customized operating modes through interaction with a user interface provided for display by the mobile computing device 102. In some implementations, customized operating modes may be implemented through interaction with a user interface provided for display by the remote computing device 106.

In some implementations, the control scheme can correlate actions and/or operating modes with time periods, events, and/or contexts. For instance, the control scheme can specify actions and/or operating modes when the mobile computing device 102 is located at a particular location during a particular time period (but not outside of the time period). Similarly, the control scheme can specify actions and/or operating modes when the mobile computing device 102 is located at a particular location during a particular event and/or context, such as in an emergency, during a speech, performance, etc., and/or other suitable contexts or events. It will be appreciated that the control scheme can correlate actions and/or operating modes to time periods, events, and/or contexts in conjunction with and/or independently from location. It will be further appreciated that the control scheme can further correlate actions and/or operating modes to various other suitable parameters or conditions.

As indicated, the control scheme can correlate such actions and/or operating modes with various conditions (e.g. location, time periods, events, etc.), such that upon the conditions being met, the function controller 110 can be configured to perform the corresponding actions and/or implement the corresponding operating modes. For instance, in implementations wherein the control scheme specifies operating modes, the function controller 110 may implement the operating mode by performing one or more suitable actions to bring the functionality, capabilities, and/or settings into accordance with the operating mode.

In some implementations, when the location estimator 108 determines that the mobile computing device 102 is located at a location specified in the control scheme, the function controller 110 can perform corresponding actions and/or implement the corresponding operating mode to control suitable aspects of the functionality of the mobile computing device 102. Such control may remain while the mobile computing device 102 is located at the location specified in the control scheme. Upon a detection by the location estimator 108 that the mobile computing device has left the specified location, the function controller 110 can perform one or more actions to revoke the control, for instance, by "resetting" the functionality to the previous functionality (e.g. prior to the detection of the mobile computing device 102 at the specified location), and/or to a default operating mode. In this manner, the location estimator 108 can monitor the location of the mobile computing device 102, and upon a detection that the mobile computing device 102 has exited from the specified location (and/or that another required condition is no longer met), function controller 110 may respond accordingly.

Figure 2:
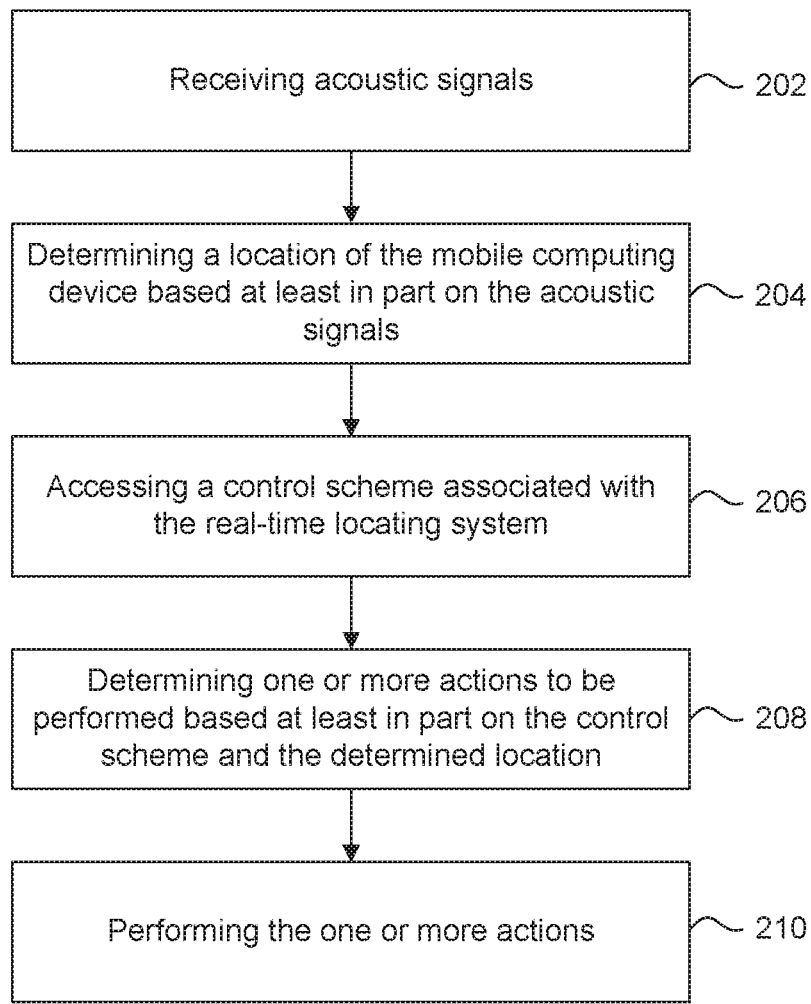
FIG. 2 depicts a flow diagram of an example method of providing location-based functionality according to example aspects of the present disclosure.

FIG. 2 depicts a flow diagram of an example method (200) of providing location-based services associated with a mobile computing device according to example aspects of the present disclosure. The method (200) can be implemented by one or more computing devices, such as one or more of the computing devices described with respect to FIG. 4. In some implementations, the method (200) can be implemented by the location estimator 108, and/or the function controller 110 of FIG. 1. In addition, FIG. 2 depicts steps performed in a particular order for purposes of illustration and discussion. Those of ordinary skill in the art, using the disclosures provided herein, will understand that the steps of any of the methods described herein can be adapted, rearranged, expanded, omitted, or modified in various ways without deviating from the scope of the present disclosure.

At (202), the method (200) can include receiving acoustic signals from one or more transmitting devices associated with an acoustic real-time locating system. The one or more transmitting devices can be positioned within a suitable environment and may transmit (e.g. periodically or at other intervals) acoustic (e.g. ultrasonic) signals that may be received by suitable mobile computing devices located within a broadcast range of the respective one or more transmitting devices. Acoustics signals transmitted by a transmitting device may encode identifying data associated with the transmitting device and/or other data, such as environmental data descriptive of the various characteristics or attributes of the environment. In some implementations, the acoustic signals may encode control scheme data indicative of one or more actions to be performed by a mobile computing device upon receipt of the acoustic signals.

At (204), the method (200) can include determining a location of the mobile computing device based at least in part on the acoustic signals. The location may be determined using various suitable location determination techniques. The location may be determined at a suitable resolution or accuracy. For instance, the location may be determined using identifying data associated with the transmitting device(s), arrival times or other data associated with the received acoustic signals, data descriptive of various characteristics of the acoustic signals and/or transmitting device (s), and/or environmental data associated with the environment in which the transmitting device(s) is located. In some implementations, the location may be determined using suitable geometric calculations, such as by using triangulation, trilateration, multilateration, and/or other suitable techniques.

At (206), the method (200) can include accessing a control scheme (or control scheme data) associated with the real-time locating system. The control scheme may specify various conditions and may correlate the conditions with actions to be performed and/or operating modes associated with a mobile computing device. Such conditions may include location, temporal conditions, various events or contexts, and/or other suitable conditions. For instance, the control scheme may correlate a location with one or more actions to be performed by a mobile computing device upon a detection of the mobile computing device at the location. As another example, the control scheme may correlate a location and a time period with an operating mode that a mobile computing device is to implement upon a detection of the mobile computing device at the location during the time period. In some implementations, the required accuracy or resolution of the location determined in (204) may be specified by the control scheme. In implementations wherein the control scheme data is encoded in the received acoustic signals, accessing the control scheme can include decoding the control scheme data associated with the received acoustic signals and/or identifying such control scheme data.

The actions to be performed can include silencing ringtones, keyboard clicks, notification sounds and/or other sounds associated with the mobile computing device, disabling one or more radios (e.g. RF radios) associated with the mobile computing device, blocking access to one or more applications, websites, etc. installed on or otherwise associated with the mobile computing device, disabling a provision of notifications by the mobile computing device, and/or other suitable actions. Example operating modes can include a silent mode wherein ringtones, keyboard clicks, notification sounds, etc. are disabled on the mobile computing device 102, an airplane mode wherein one or more radios (e.g. RF radios) are disabled on the mobile computing device, a "do not disturb" mode wherein various notifications and/or alerts are not provided to a user of the mobile computing device, a security mode wherein a passcode is required upon waking a display of the mobile computing device, an education mode wherein access is blocked to various applications (e.g. social media applications) installed on the mobile computing device, a driving mode wherein access is limited with respect to various aspects (e.g. the ability to make telephone calls, send text messages, access applications, etc.) of the mobile computing device, etc. The operating modes and/or actions may be customized for particular mobile computing devices, locations, contexts, times, etc. In this manner, a user may implement a suitable control scheme through interaction with one or more computing devices associated with the real-time locating system.

At (208), the method (200) can include determining one or more actions to be performed based at least in part on the control scheme and the determined location. In this manner, a location that corresponds to the determined location may be identified in the control scheme. In implementations wherein the control scheme correlates the identified location with actions, determining the actions to be performed may include identifying the suitable actions as specified in the control scheme. In implementations wherein the control scheme correlates the identified location with an operating mode, determining the actions to be performed may include identifying the suitable operating mode as specified in the control scheme and determining one or more actions to be performed to implement the operating mode.

At (210), the method (200) can include performing the one or more actions. In this manner, the one or more actions may be performed by the mobile computing device to bring the functionality of the mobile computing device into accordance with the control scheme.

Figure 3:
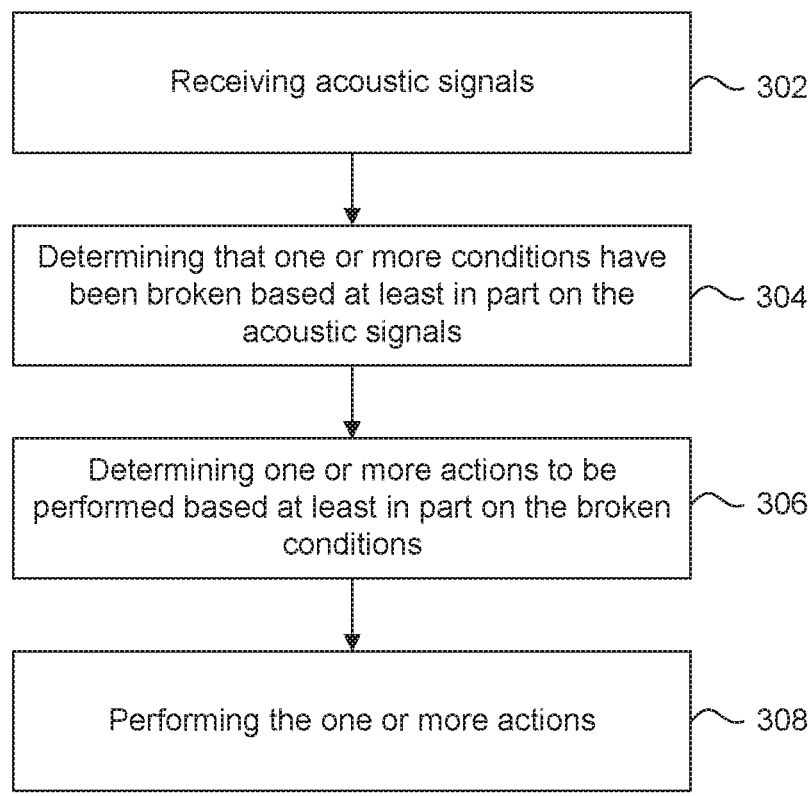
FIG. 3 depicts a flow diagram of revoking location-based control according to example aspects of the present disclosure.

FIG. 3 depicts a flow diagram of an example method (300) of providing location-based control of a mobile computing device according to example aspects of the present disclosure. The method (300) can be implemented by one or more computing devices, such as one or more of the computing devices described with respect to FIG. 4. In some implementations, the method (300) can be implemented by the location estimator 108, and/or the function controller 110 of FIG. 1. In addition, FIG. 3 depicts steps performed in a particular order for purposes of illustration and discussion.

At (302), the method (300) can include receiving acoustic signals. The acoustic signals can be transmitted by one or more transmitting devices, such as described above with reference to (202) of the method (200). In some implementations, the acoustic signals can encode control scheme data indicative of one or more actions to be performed by a mobile computing device upon receipt of the acoustic signals. As indicated above, such control scheme data encoded in the acoustic signals transmitted by a transmitting device may vary with time. For instance, such control scheme data can encoded by acoustic signals transmitted by a transmitting device associated with an airplane vary with respect to different actions to perform during different phases of a flight. In this manner, the control scheme data encoded in the acoustic signals received at (302) can be different that the control scheme data encoded in the acoustic signals received at (202) of the method (200) described above with respect to FIG. 2. At (304), the method (300) can include determining that one or more conditions have been broken (or that are different) based at least in part on the received acoustic signals. For instance, determining that one or more conditions have been broken can include determining that a time period corresponding to one or more actions (as specified in the control scheme) has expired. As another example determining that one or more conditions have been broken can include determining that the mobile computing device has exited a location specified in the control scheme. For instance, as described above with reference to the method (200), upon detection of entry into a location specified by the control scheme, the mobile computing device may perform one or more actions based at least in part on the control scheme. In this manner, control of the functionality may be implemented while the mobile computing device is located at the location specified by the control scheme. Upon an exit by the mobile computing device from the location, the exit may be detected using various suitable location determination techniques. In some implementations, the exit may be detected based at least in part on the acoustic signals received in (302). In some implementations, the exit may be detected without receiving such acoustic signals, for instance, using a positioning system (e.g. GPS system) associated with the mobile computing device.

As yet another example, determining that one or more conditions have been broken can include identifying one or more different actions to be performed based at least in part on the control scheme data as encoded in the received acoustic signals. For instance, with respect to the methods (200) and (300), the received acoustic signals at (202) can include first action(s) to be performed, and the received acoustic signals at (302) can include second action(s) to be performed indicative of one or more broken (or different) conditions.

At (306), the method (300) can include determining one or more actions to be performed based at least in part on the broken conditions. As indicated, various controls may be implemented while the mobile computing device is located at the location specified by the control scheme and/or when one or more other specified conditions are met. Such controls may be revoked in response to the detection of one or more broken conditions, such as an exit from a location specified in the control scheme. In this manner, determining one or more actions to be performed may include determining one or more actions required to revoke the controls. In some implementations revoking the control may include restoring the operation of the mobile computing device to that prior to the control scheme-based control. In some implementations, revoking the control may include implementing a default operating mode on the mobile computing device.

At (308), the method (300) can include performing the one or more actions.

The one or more actions may be performed to revoke the control as described with respect to (304), and/or to implement a default operating mode or prior operation of the mobile computing device.

Figure 4:
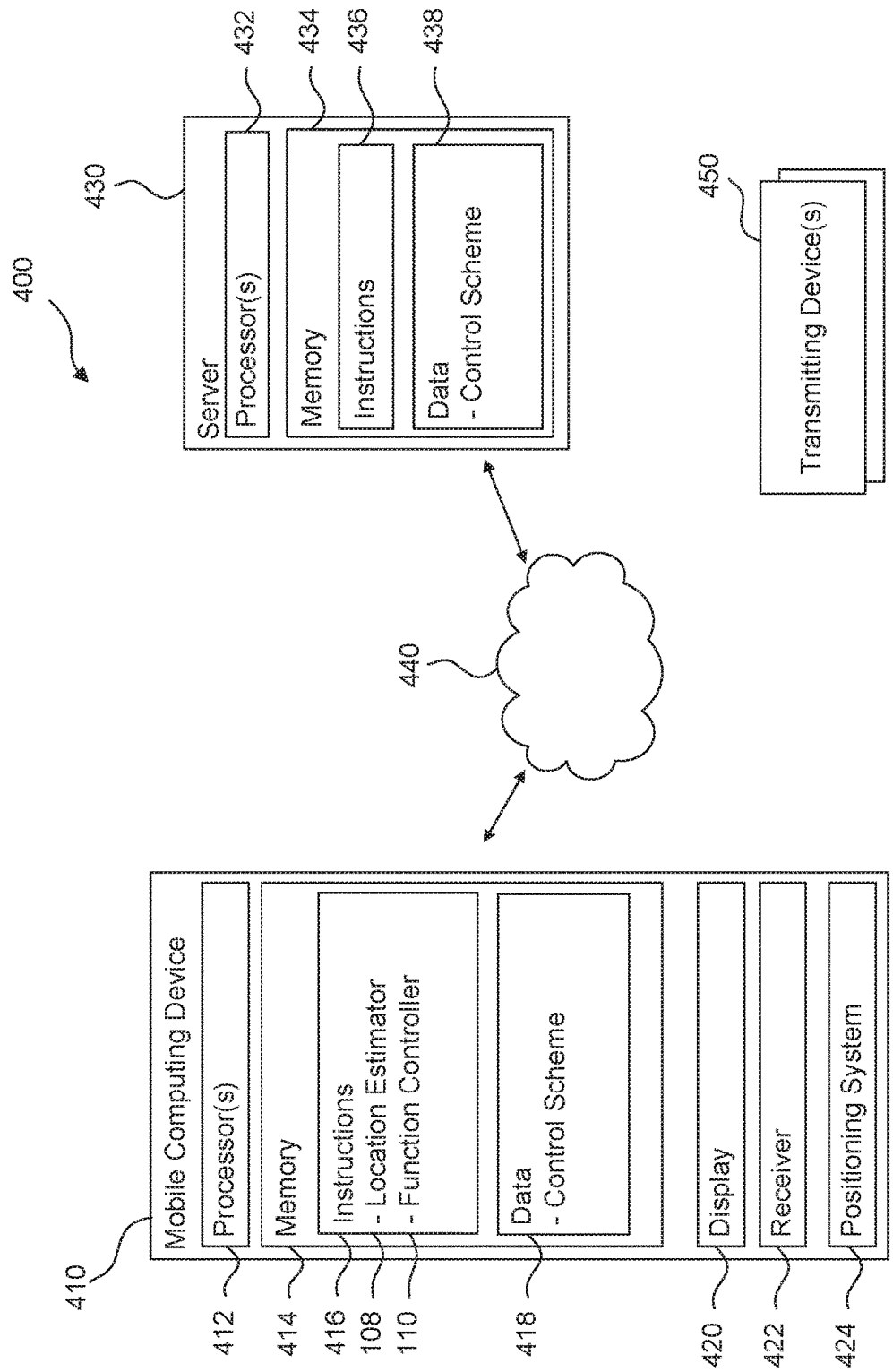
FIG. 4 depicts an example system according to example aspects of the present disclosure.

FIG. 4 depicts an example system 400 that can be used to implement the methods and systems of the present disclosure. In some implementations, the system 400 can be at least a portion of a real-time locating system configured to determine the locations of various suitable mobile computing devices. The system 400 can be implemented using a client-server architecture that includes a mobile computing device 410 that communicates with one or more remote computing devices, such as server 430. The system 400 can be implemented using other suitable architectures.

As shown, the system 400 can include a mobile computing device 410. The mobile computing device 410 can be any suitable type of mobile computing device, such as a smartphone, tablet, cellular telephone, wearable computing device, or any other suitable mobile computing device capable of being used in mobile operation. In some implementations, the mobile computing device can be a dedicated tag (e.g. passive or active) or other device for use in the real-time locating system. The mobile computing device 410 can include one or more processor(s) 412 and one or more memory devices 414.

The one or more processor(s) 412 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 414 can include one or more computer-readable media, including, but not limited to, non-transitory computer-readable media, RAM, ROM, hard drives, flash memory, or other memory devices.

The one or more memory devices 414 can store information accessible by the one or more processors 412, including instructions 416 that can be executed by the one or more processors 412. For instance, the memory devices 414 can store the instructions 416 for implementing one or more modules configured to implement a location estimator 108 and/or a function controller 110, and/or other suitable modules.

Each of the location estimator 108 and function controller 110 can include computer logic utilized to provide desired functionality. Thus, each of the location estimator 108 and function controller 110 can be implemented in hardware, application specific circuits, firmware and/or software controlling a general purpose processor. In one embodiment, each of the location estimator 108 and function controller 110 are program code files stored on the storage device, loaded into memory and executed by a processor, or can be provided from computer program products, for example computer executable instructions, that are stored in a tangible computer-readable storage medium such as RAM, hard disk or optical or magnetic media. The location estimator 108 and function controller 110 can each correspond to one or more different programs, files, circuits, or sets of instructions. Likewise, the location estimator 108 and function controller 110 can be combined into a single program, file, circuit, or set of instructions.

The instructions 416 can further include instructions for implementing a browser, for running a specialized application, or for performing other functions on the mobile computing device 410. For instance, the specialized application can be used to exchange data with server 430 over the network 440. The instructions 416 can include client-device-readable code for providing and implementing aspects of the present disclosure. For example, the instructions 416 can include instructions for implementing an application associated with the real-time locating system, or a third party application implementing wayfinding, asset tracking, or other services on the mobile computing device 410.

The one or more memory devices 414 can also include data 418 that can be retrieved, manipulated, created, or stored by the one or more processors 412. The data 418 can include, for instance, control scheme data, and/or other data.

The mobile computing device 410 can include various input/output devices for providing and receiving information from a user, such as a touch screen, touch pad, data entry keys, speakers, and/or a microphone suitable for voice recognition. For instance, the mobile computing device 410 can have a display 420 for presenting a user interface to a user.

The mobile computing device 410 can further include a positioning system 424. The positioning system 424 can be any device or circuitry for determining the position of the mobile computing device 410. For example, the positioning system 424 can determine an actual or relative location of the mobile computing device 410 based at least in part on acoustic signals received from transmitting device(s) 450 in accordance with example aspects described herein. In some implementations, the positioning system 424 can determine actual or relative location by using a satellite navigation positioning system (e.g. a GPS system, a Galileo positioning system, the GLObal Navigation satellite system (GLONASS), the BeiDou Satellite Navigation and Positioning system), an inertial navigation system (e.g. using positioning sensors, such as an inertial measurement unit), a dead reckoning system, based on IP address, by using triangulation and/or proximity to cellular towers, Bluetooth hotspots, BLE beacons, Wi-Fi access points or Wi-Fi hotspots, Wi-Fi time-of-flight, and/or other suitable techniques for determining position.

The mobile computing device 410 can also include a network interface used to communicate with one or more remote computing devices (e.g. server 430) over a network 440. The network interface can include any suitable components for interfacing with one more networks, including for example, transmitters, receivers, ports, controllers, antennas, or other suitable components.

The mobile computing device 410 can further include a communication system 422 used to communicate with one or more transmitting devices, such as transmitting device(s) 450. The communication system 422 can include, for instance, one or more suitable transducers (e.g. microphone devices) configured to receive acoustic (e.g. ultrasonic) signals from the transmitting device(s) 450.

In some implementations, the mobile computing device 410 can be in communication with a remote computing device, such as a server 430 over network 440. Server 430 can include one or more computing devices. The server 430 can include one or more computing devices, and can be implemented, for instance, as a parallel or distributed computing system. In particular, multiple computing devices can act together as a single server 430.

Similar to the mobile computing device 410, the server 430 can include one or more processor(s) 432 and a memory 434. The one or more processor(s) 432 can include one or more central processing units (CPUs), and/or other processing devices. The memory 434 can include one or more computer-readable media and can store information accessible by the one or more processors 432, including instructions 436 that can be executed by the one or more processors 432, and data 438. For instance, although the location estimator 108 and function controller 110 are depicted in FIG. 4 as being included in the mobile computing device 410, in other implementations, one or more of the location estimator 108 and function controller 110 can be included in the server 430. In this manner, it will be appreciated that any of the methods disclosed herein can be performed in whole or in part at the server 430. For instance, one or more aspects of any location determination techniques (e.g. data storage, processing, filtering, calculations, etc.) and/or functionality control according to example aspects of the present disclosure may be performed in whole or in part at the server 430.

The data 438 can be stored in one or more databases. The data can include acoustic model data and other data. The one or more databases can be connected to the server 430 by a high bandwidth LAN or WAN, or can also be connected to server 430 through network 440. The one or more databases can be split up so that they are located in multiple locales.

Server 430 can also include a network interface used to communicate with mobile computing device 410 over network 440. The network interface can include any suitable components for interfacing with one more networks, including for example, transmitters, receivers, ports, controllers, antennas, or other suitable components.

Network 440 can be any type of communications network, such as a local area network (e.g. intranet), wide area network (e.g. Internet), cellular network, or some combination thereof. Network 440 can also include a direct connection between the mobile computing device 410 and server 430. Network 440 can include any number of wired or wireless links and can be carried out using any suitable communication protocol.

The system 400 can further include one or more transmitting devices, such as transmitting device(s) 450. The transmitting device(s) 450 can transmit acoustic signals (e.g. ultrasonic signals) such as described with regard to transmitting device(s) 104 in FIG. 1. In some implementations, the transmitting device(s) 450 can transmit other suitable signals, such as radio frequency signals. The transmitting device(s) 450 can be implemented using any suitable computing device(s). The transmitting device(s) 450 can include one or more transducers configured to emit acoustic or other suitable signals that can be used by the mobile computing device 410 to facilitate a location estimation of the mobile computing device 410 according to example aspects of the present disclosure. It will be appreciated by those skilled in the art that any suitable number of transmitting devices 450 can be included in the system 400.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of providing location-based functionality by a mobile computing device using acoustic signals, the computer-implemented method comprising:
    receiving, by a mobile computing device, acoustic signals via air from two or more transmitting devices associated with a real-time locating system, the acoustic signals including a respective unique encoded identification for each of the two or more transmitting devices;
    determining, by the mobile computing device, a location of the mobile computing device based at least in part on decoding the respective unique encoded identification in the received acoustic signals;
    determining, by the mobile computing device, one or more actions to perform based at least in part on a control scheme associated with the real-time locating system and the determined location; and
    performing, by the mobile computing device, the one or more actions.

2. The computer-implemented method of claim 1, wherein the control scheme correlates various locations associated with the real-time locating system with one or more actions to be performed by the mobile computing device.

3. The computer-implemented method of claim 2, wherein the control scheme further correlates one or more time periods with the one or more actions to be performed by the mobile computing device.

4. The computer-implemented method of claim 3, wherein the one or more actions to be performed by the mobile computing device comprise at least one of disabling use of one or more aspects of the mobile computing device, disabling one or more radio transmitters of the mobile computing device, disabling one or more radio receivers of the mobile computing device, disabling one or more applications installed on the mobile computing device, limiting access to one or more applications installed on the mobile computing device, adjusting an audio mode of the mobile computing device, or adjusting a security mode of the mobile computing device.

5. The computer-implemented method of claim 1, wherein the real-time locating system comprises a plurality of ultrasonic transmitting devices distributed throughout an environment, and wherein the receiving, by the mobile computing device, the acoustic signals from the two or more transmitting devices comprises receiving ultrasonic signals from the two or more transmitting devices.

6. The computer-implemented method of claim 1, wherein determining, by the mobile computing device, the location of the mobile computing device comprises determining a relative location of the mobile computing device within an environment associated with the real-time locating system.

7. The computer-implemented method of claim 1, further comprising, responsive to determining the location of the mobile computing device, accessing, by the mobile computing device, the control scheme.

8. The computer-implemented method of claim 1, further comprising:
    determining, by the mobile computing device, that the mobile computing device has exited the determined location; and
    in response to determining that the mobile computing device has exited the determined location, revoking, by the mobile computing device, control functionality associated with the determined location.

9. The computer-implemented method of claim 8, wherein revoking, by the mobile computing device, the control functionality comprises performing, by the mobile computing device, one or more actions to implement a default operating mode of the mobile computing device.

10. The computer-implemented method of claim 1, wherein the acoustic signals further include respective encoded sound pressure levels, and wherein the determining the location of the mobile computing device further includes decoding the respective encoded sound pressure levels.

11. The computer-implemented method of claim 1, wherein the acoustic signals further include an encoded identifier of a surface on which one of the two or more transmitting devices is located.

12. The computer-implemented method of claim 1, wherein the acoustic signals further include an encoded dimension of a room in which one of the two or more transmitting devices is located.

13. The computer-implemented method of claim 12, wherein the determining the location of the mobile computing deice further includes using at least one of arrival times, angles of arrival, time differences of arrival, or times of flight in conjunction with the encoded dimension.

14. The computer-implemented method of claim 1, wherein the acoustic signals further include encoded atmospheric data indicative of a speed of sound.

15. The computer-implemented method of claim 1, wherein the location of the mobile computing device is one of an airplane or a classroom.

16. The computer-implemented method of claim 1, wherein the acoustic signals further include encoded signal coding type data.

17. The computer-implemented method of claim 1, wherein the acoustic signals further include encoded signal spatial distribution data.

18. The computer-implemented method of claim 1, wherein the acoustic signals further include encoded control scheme data, the encoded control scheme data indicating the one or more actions to be performed.

19. The computer-implemented method of claim 1, wherein the acoustic signals further include encoded data indicating an initial takeoff phase of a flight.

20. The computer-implemented method of claim 1, wherein the acoustic signals further include encoded data indicating one or more phases of a flight.

* * * * *

UNITED STATES PATENT AND TRADEMARK OFFICE
CERTIFICATE OF CORRECTION

PATENT NO. : 11,733,345 B2
APPLICATION NO. : 16/964849
DATED : August 22, 2023
INVENTOR(S) : Aasen et al.

Page 1 of 1

It is certified that error appears in the above-identified patent and that said Letters Patent is hereby corrected as shown below:

In the Claims

In Column 18, Claim 13, Line 56, delete "deice" and replace with --device--.

Signed and Sealed this
Third Day of October, 2023

Katherine Kelly Vidal
*Director of the United States Patent and Trademark Office*